(No Model.) 2 Sheets—Sheet 1.
J. MACPHAIL.
TWINE REGULATOR OR TENSION DEVICE FOR HARVESTER GRAIN BINDERS.
No. 538,426. Patented Apr. 30, 1895.
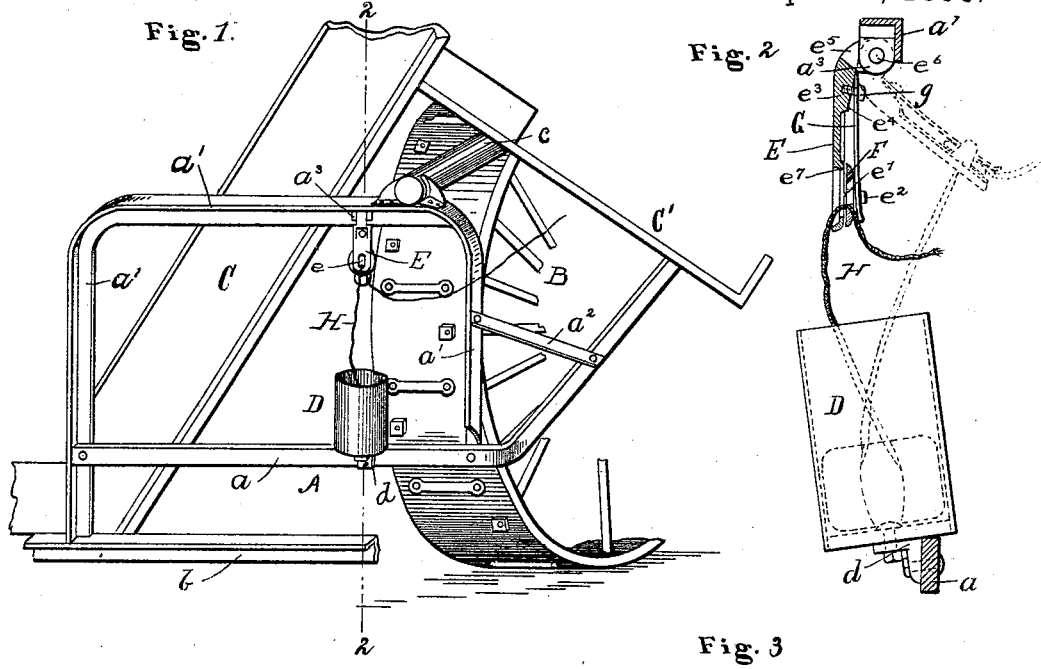
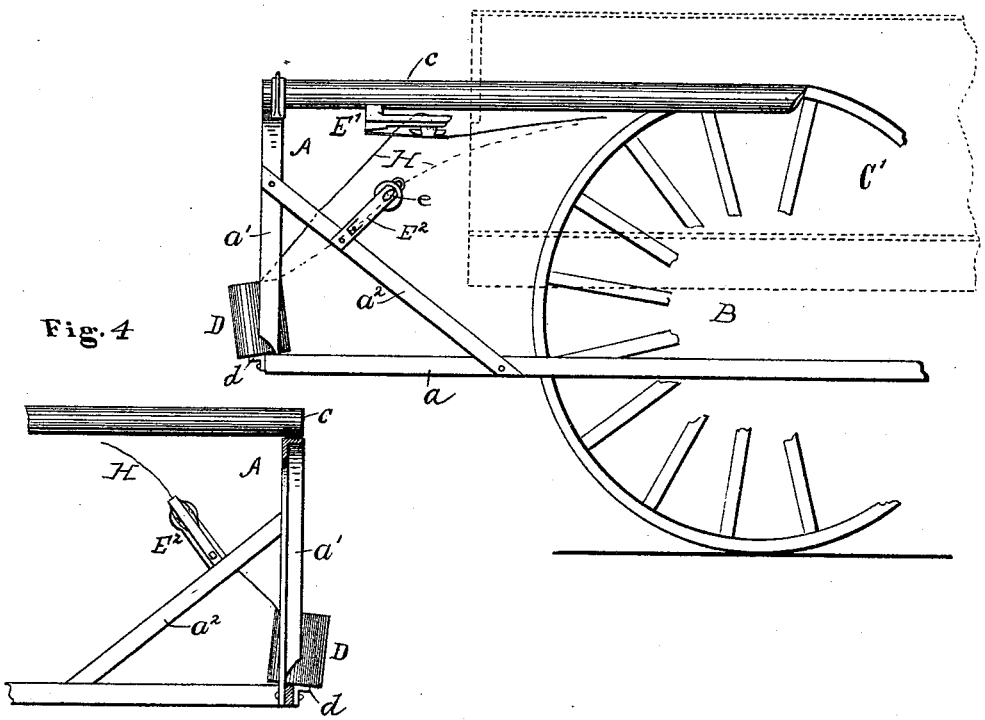
Witnesses
C. F. Blake
A. A. Murray
Inventor,
James Macphail.
By _____ Attys.

(No Model.) 2 Sheets—Sheet 2.
J. MACPHAIL.
TWINE REGULATOR OR TENSION DEVICE FOR HARVESTER GRAIN BINDERS.
No. 538,426. Patented Apr. 30, 1895.
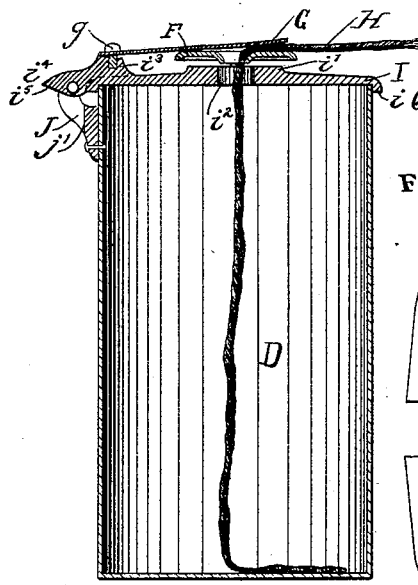
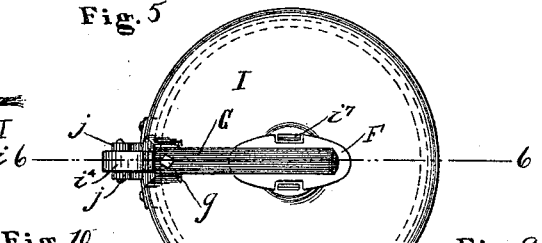
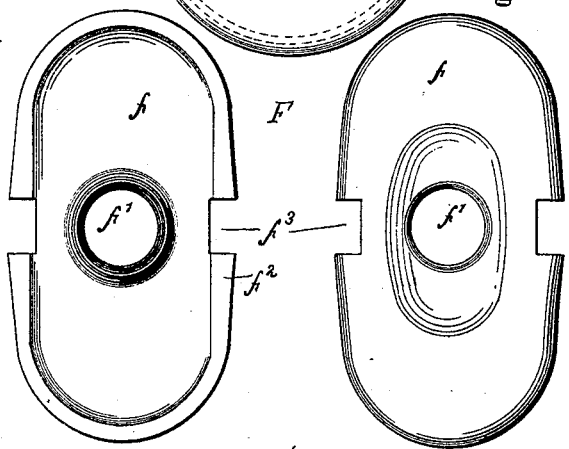
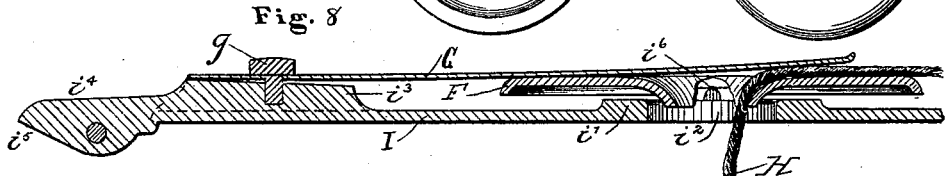
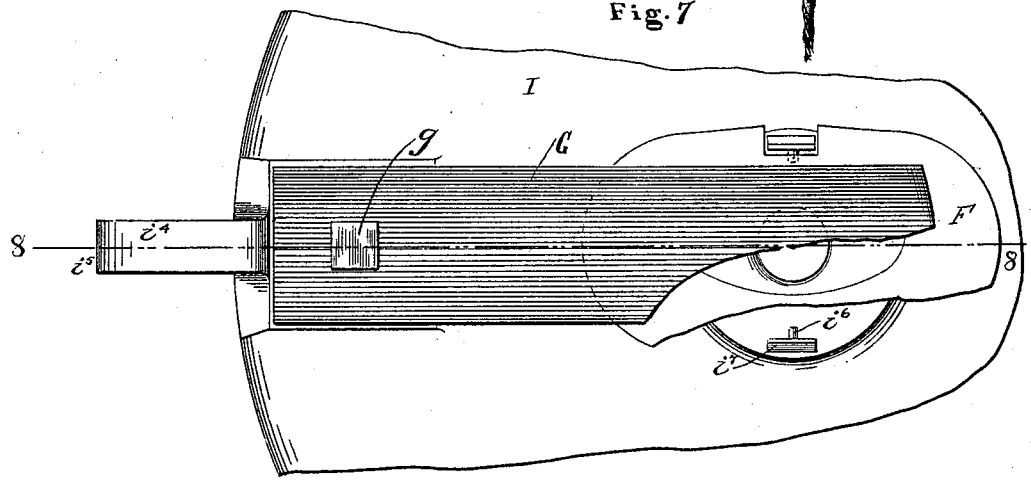
Witnesses
C. F. Blake
A. A. Murray
Inventor
James Macphail
By Obnnnthacher
Attys.

UNITED STATES PATENT OFFICE.

JAMES MACPHAIL, OF BLUE ISLAND, ASSIGNOR TO THE PLANO MANUFACTURING COMPANY, OF CHICAGO, ILLINOIS.

TWINE-REGULATOR OR TENSION DEVICE FOR HARVESTER GRAIN-BINDERS.

SPECIFICATION forming part of Letters Patent No. 538,426, dated April 30, 1895.

Application filed February 26, 1895. Serial No. 539,763. (No model.)

*To all whom it may concern:*

Be it known that I, JAMES MACPHAIL, a citizen of the United States, residing at Blue Island, in the county of Cook and State of Illinois, have invented a certain new and useful Improvement in Twine-Regulators or Tension Devices for Harvester Grain-Binders, which is fully set forth in the following specification, reference being had to the accompanying drawings, in which—

Figure 1 represents a perspective view of a portion of a grain-binding harvester embodying my invention, looking toward the rear stubble corner of the machine; Fig. 2, a detail section of the same, taken on the line 2 2 of Fig. 1; Fig. 3, an end elevation of Fig. 1, looking from the stubble, but with the tension device differently arranged; Fig. 4, a detail elevation of the rear portion of Fig. 3, looking from the inside thereof and showing the tension device only on the brace; Fig. 5, a plan view of a twine-box with the tension device applied to its cover; Fig. 6, a vertical section of the same, taken on the line 6 6 of Fig. 5; Fig. 7, a detail plan similar to Fig. 5, but partly broken away; Fig. 8, a vertical section of the same, taken on the line 8 8 of Fig. 7; Fig. 9, a plan view of the regulating-plate detached, and Fig. 10 a bottom plan view of the same. In these drawings, Figs. 1, 3, and 4 are on one scale, Fig. 2 upon a scale by itself, enlarged, Figs. 5 and 6 upon another scale, still more enlarged, and the remaining views, Figs. 7 to 10, inclusive, on a scale further enlarged, being substantially full-sized.

My present invention relates to automatic grain binding harvesters and especially to a mechanism or device, for regulating the tension on the twine, located at some point between the twine box and the binding devices.

The invention consists mainly in a movable adjuster or regulator, over which the twine passes as it runs from the box to the binder, and an elastic or yielding holder arranged above the regulator and adapted to hold the twine thereto and also to keep the regulator plate itself upon its support and under proper adjustment.

The construction and operation of mechanism designed for the purpose stated above, embodying my invention, under different locations on the machine, will now be set forth in a detailed description, with reference, as required, to the drawings; and the improvements believed to be new and which it is desired to secure by Letters Patent will then be more definitely set forth in claims.

In the drawings only a small portion of the general machine is shown. It is not necessary to show the entire machine, for its construction in all main features may be of any known description, and automatic grain binding harvesters are well known and in general use. For the purposes of the present application it is sufficient to show and describe the twine regulating or tension devices to which the invention relates and such few general parts of the machine as are necessary to an understanding of the location or arrangement of this device on the machine.

In the drawings, A. represents a portion of the upright or main frame of a grain harvester, $a$. being the horizontal bar running along on the outside and then in rear of the main wheel, B.; and $a'$. the rear upright member of the said frame. These two parts are connected and strengthened by a diagonal brace bar, $a^2$., at the rear corner of the frame outside of the wheel. Only a small part of the platform is shown, the rear sill, $b$., thereof being substantially all. The elevator frame, C., and binder frame or table, C'., are shown only in part, these portions of the machine being of any ordinary and well known construction and organization. Only so much of all these general features of a grain binding harvester is shown as seems to be required for the purpose of clearly understanding the real invention in the present case, its relation to other parts of the machine in working organization, and different locations in which it may be placed.

As shown in Figs. 1 to 4 of the drawings, the twine box or receptacle, D., is mounted on the rear portion of the horizontal bar $a$. by bolting the bottom thereof to a small, angular bracket, $d$., fastened to said frame bar, the upper member or seat portion of this bracket being preferably inclined downward a little, so as to give the receptacle a slight inclination to the rear, though this is not a really essential feature. The twine box, as shown in the said figures, is open at the top, as is usual in this device.

The regulator or tension device for the twine, which is the main part of the present invention, will now be described. As shown in Figs. 1 to 4 of the drawings, this mechanism consists of a base plate or main support. This base plate or carrier, E., as shown, is a small plate of metal, of much greater length than width, enlarged slightly in circular form at its outer or free end, with an oval opening, $e$., therein, the greater length of which runs lengthwise of the plate. On what may be called the outer or front face of this plate, there are short, tapering lugs, $e'$., rising a little way from this face of the plate and arranged directly opposite each other across said opening. Outside of each of these small lugs there is a much larger lug or stud, $e^2$., also tapering outward and preferably arranged on the respective outside edges of the plate, on each side of the perforation therein. At the opposite end of this base plate there is an enlargement, $e^3$., produced by thickening this end of the plate, and the outer or front face is inclined downward and inward, as seen at $e^4$. At the extremity of this end of the plate there is a short, stout arm, $e^5$., projecting outward in line with the base plate and preferably bent slightly to the front thereof, as indicated in Fig. 2. This short arm is provided with a perforation, $e^6$., by means of which it may be pivoted to its support or carrier, when it is desired to mount the device on the machine in this way. Around the opening in the outer end of this base plate which has been described above, there is provided a small rib or flange, $e^7$, extending around this opening on the front side of the base plate, and preferably the opposite or back side of the plate in this circular end is sunk or depressed to a corresponding degree, as indicated in Fig. 2, though this is not really an essential feature.

The twine as it runs from the receptacle, in which it is placed, to the binding mechanism, is to pass through the opening in this base plate, wherever it may be located on the machine. In order to regulate and adjust this feed of the twine to the binder, there are provided what may be called an adjuster or adjusting plate, F., and a regulator or tension device which, as shown in the drawings, is a long, narrow spring G. These two devices are constructed and arranged to co-operate, in action upon the twine, to make the feed thereof regular and uniform.

The adjuster, F., consists of a body, $f$., of oblong shape. About at the center of this body there is an opening, $f'$., which is surrounded by a flange, $f^2$., depending from the body and formed on a curve or bend. This circular flange is adapted to enter the opening in the outer end of the base plate described above, and the twine is intended to be carried out over this curved surface, when the regulator is in this position, and thence over the face of the latter to the binder. At each side of this small plate, which may be called the regulator or adjuster, a notch, $f^3$., is cut about midway of the length of the oblong piece and opposite the central opening therein. These notches are adapted to receive the larger studs or lugs, $e^2$., and in this way the small regulator plate is loosely connected to the base plate. The relative width of the notches, as compared with that of the studs, is such that the small regulating plate cannot be set into contact with the base, so as to rest thereon, but will be held entirely by the inclined edges of the studs some little distance away from the base, which arrangement provides for a free, though limited, rocking movement of the regulator plate in the direction of its length, provided it is held upon the studs by a yielding force. The spring G. furnishes this yielding force. It is a long, straight, narrow strip of elastic metal secured at one end to the inclined face, $e^4$., on the thickened end of the base plate E. by means of a setting bolt or screw, $g$., upon which the spring may be vibrated or turned as a pivot. From this point of fastening, the spring, in working adjustment, is extended out over the regulator base plate, and the rocking, regulating, or adjusting plate F., passing over the central opening therein. The width of this spring is such that it may pass freely between the projecting upper ends of the studs on which the adjuster F. is supported and extend out nearly or quite to the opposite or outer end of this device. This end of the spring is perfectly free and is intended to rest with tensile force upon the face of the tilting regulator, thereby holding the latter in place upon its supporting studs and at the same time permitting a movement thereof upon these studs as a kind of pivotal support. The incline of the face to which the opposite end of the spring is attached, as described, tends to aid in this action.

Now, wherever this device is located on the machine, it is intended that the twine, H., in passing from the receptacle in which it is placed to the binder, shall be run into the opening in the base plate E. at the back thereof, thence into the central and flaring opening in the regulator plate F. and out over the face of the latter and between it and the free end of the spring, which is designed to rest upon the twine, thereby providing a yielding resistance or tension for the twine by means of which the run of the latter is governed. In rear of this opening, it is expected that the spring will rest upon the rear end of the adjusting plate, and its tensile force will tend to tilt the regulator slightly on its supporting studs, so that these two devices will always automatically adjust themselves, relatively to each other, to provide for a uniform yielding pressure on the twine and a straight run out between the spring and face of the regulator. Grain binding twine is not very uniform. In fact, it is so uneven that it would be impossible to run it through a fixed space or aperture, if the boundaries thereof were stationary and intended to fit the normal size of the twine. The slightly tilting or oscillating plate and the spring operating in connection therewith obviate this difficulty and provide a substantially uniform tension on the twine as it is run out to the binder, the irregularities in the twine being perfectly accommodated by the slight tilting of the plate and a similar yielding of the spring as the twine passes between them.

This device may be mounted on the machine in different ways and at different places, and it may be either fixed or movable. An attachment which permits the device to turn or swing upon a hinge is desirable and therefore will first be described. This mode of attachment is illustrated in Figs. 1 and 2 of the drawings. The base plate of the regulating device is connected, by hinge or pivot joint, to the rear upright member, $a'$., of the main frame. As shown in the drawings referred to, this section, $a'$., is of angle iron and the regulator is connected thereto by a pivot or journal passing through the aperture in the bent end of the former, and short lugs, $a^3$., on the upper horizontal portion of the said upright. Preferably the regulator is hinged nearly over the twine box, though this exact arrangement is not absolutely necessary, and is free to swing forward and back with reference to the machine. The twine, H., is carried up from its receptacle through the regulator, as already described, and thence forward to the binder, and the strain on the twine in the usual feed required in binding will naturally swing this device forward toward the binder, as indicated in dotted lines in Fig. 2, thereby making the line of feed through this device a little more direct and without such sharp turns as would be the case if it depended vertically in a fixed position from its support. Of course, when released from the feed strain, the weight of the regulator turned forward into an inclined position, as indicated by the dotted lines in Fig. 2, will operate to swing it back into its normal position of rest shown in full lines in said figure. Now, it is well known that there is always a little slack in the twine between the binder and the twine receptacle, when a bundle has been bound and discharged. Obviously the twine will be clasped in the regulator, as already described, so that, in this backward swing of the regulator, the slack in the twine will be taken up, a point in the operation of the device, not of first importance, but at the same time quite desirable in the action of the whole binding mechanism.

The usual way of mounting the binder frame or table is by means of a rod, c., which is preferably supported on the upright portion of the main frame. The twine regulator may be attached to this rod, and this location is shown in Fig. 3, in which the said device, E'., is shown attached to the under side of the rod near the rear end thereof. The attachment, in this location, is preferably rigid and therefore the end projection for hinging purposes, described above and shown in Figs. 1 and 2, is dispensed with. In other respects the device is substantially the same as already described. Therefore a detail description of these parts is unnecessary. It would be mere repetition.

The device may also be mounted on the brace bar, $a^2$., and this arrangement is also illustrated in Fig. 3, in which the device is indicated by the letter $E^2$. with the twine in dotted lines. The same arrangement is illustrated in Fig. 4, but looking from the other or inside of the support and with the twine in full lines.

Another modification in the location of the regulator is effected by mounting it on a cover fitted to the top of the twine box or receptacle. This is the arrangement shown in the drawings, Figs. 5 to 10, inclusive. The receptacle itself is the same as illustrated in the other figures and so is indicated by the same letter, D; but a cover, I., is provided, being constructed to fit the open upper end of the said receptacle. The shape of this cover corresponds with the contour of the box, and, as illustrated in the drawings this is round The cover is also circular and is provided with a short, depending edge flange, $i$., adapted to fit over the upper edge of the box. It is also provided with a central boss, $i'$., raised on the upper surface of the face and perforated centrally, as seen at $i^2$. This cover has the function and takes the place of the base plate, E., in the construction described above, and is provided at one point on its edge with an enlargement, $i^3$., similar to $e^3$. in the construction of the device described above and shown in the other figures of the drawings. There is also a short arm, $i^4$., projecting out from this raised or thickened portion of the cover, as indicated in Figs. 5, 6, 7 and 8, which is similar to the arm $e^5$. in the previously described construction and, like that, provides means for pivoting or hinging the cover to a suitable support. In this modification, the support to which this arm is pivoted, is a small bracket, J., fastened to one side of the box near its upper end, on the outside thereof, and provided with two arms, $j$., projecting outward and upward, to which this arm on the cover is hinged or pivoted. In this modification, the said hinge arm of the cover, if desired, may be provided with a short stop-finger or toe, $i^5$., at its pivot end, adapted to strike the body or base, $j'$., of the bracket to which it is hinged, thereby furnishing a stop for the backward swing of the cover.

The remaining parts of the device are constructed exactly the same as in the first device described, and are therefore indicated by the same letters as in the previous description, except the two sets of lugs or studs at the side of the opening in the base piece, the latter in this modification being the cover. These rising projections are indicated in the said drawings by $i^6$. for the inner and shorter ones, and $i^7$. for the outer and longer pair. These studs are shaped and located exactly like those indicated by the letters $e'$. and $e^2$. in the construction of the device first described, and their function being exactly the same, a repetition will not be given.

The tilting adjuster and the tension spring are precisely the same as shown with the cover in the first construction, and are therefore indicated by the same letters, F. and G. respectively. The details of construction in these two pieces, being also the same, are indicated by the same letters as before; $f$. indicating the body of the adjuster; $f'$., the central opening; $f^2$., the surrounding flange, and $f^3$. the side edge notches; while the fastening screw bolt for the spring is indicated by the letter $g$., because it is exactly the same as illustrated in the first mentioned figures.

It will be understood, of course, that the twine, H., will be run out from the box, over the adjusting plate and under the free end of the spring, just the same as described above. It is therefore indicated in the last named figures by the letter H., to identify it with the same twine in previous figures.

It is to be noted that the scale on which Figs. 5 to 10 inclusive, are drawn is much larger than the scale of any of the Figs. 1 to 4 inclusive. The details of construction of the several operative parts and the mode in which their functions are performed, therefore, will be better understood, perhaps, from these large scale figures than from the said smaller scale figures; and as the construction and operation, in all essential features, are precisely the same in the several devices, the figures of the largest scale may be studied for a complete understanding of the general construction and operation of the device.

It is also to be noted that the tension of the spring upon the twine running over the tilting plate may be regulated, as desired, by simply turning the fastening screw bolt of the spring to set it inward or outward, according to the adjustment required.

There is thus obtained, in all of the arrangements described and shown, an elastic regulating device for the out-running twine, which acts automatically and elastically to secure a uniform frictional resistance to the free escape of the twine and give it the degree of tautness required for binding. The curved surface over which the twine runs in passing out to the binder also serves to diminish the wear, but even with this construction this wear will of course take place, and in time a groove will be formed in the plate of the regulator. It is obvious, however, that the regulator is reversible, the ends being constructed alike, so that, when this wearing has occurred, it is still available by simply lifting it from its seat and then reversing and replacing it. If the spring was fixed in its straight, normal position, this reversal of the regulator would be a little difficult, and to facilitate the said adjustment the spring is free to turn on its fastening as a pivot, so that it may be swung to one side of the regulator for any purpose whatever, by simply lifting the free end, when the regulator is left perfectly free for removal from its support for the purpose of reversal or any other purpose whatever. Obviously this construction also provides for readily replacing an old, worn-out regulator by a new one, and so the entire device is not rendered useless and practically destroyed by the groove cut in the tilting plate by the out-running cord as in the usual construction of twine guides.

Several illustrations of different locations for the regulating device on the machine are shown in the drawings and referred to in the description. It is not to be understood, however, that the invention is intended to be limited to any one of these locations, so far as its general features are concerned. Either location here shown may be adopted, or any other on the machine which may be preferred. Some mechanical changes may be made also in the specific features of construction herein described and shown, and such mechanical modifications are contemplated in the practical application of this invention to different machines and are regarded as included in my invention, provided the main features of the latter as set forth above are retained.

Having thus described my invention, what I claim to be new, and desire to secure by Letters Patent, is—

1. In a twine regulator for grain binders, a base plate provided with a central opening, in combination with an adjuster arranged over and a little above the opening mounted on supports on which it is free to tilt and having a central opening corresponding to that in the base, and a spring arranged to act upon the upper face of the adjuster, substantially as described.

2. In a twine regulator for grain binders, a base plate provided with a central opening, in combination with an adjuster having a central opening surrounded by a flange on the under side curved or inclined inward, supports for the adjuster on the base on which the former is held a little above the latter and is free to vibrate thereon, and a spring arranged to act on the upper face of the adjuster, substantially as described.

3. In a twine regulator for grain binders, a base plate provided with a central opening and upright, tapering studs on each side thereof, in combination with an adjuster, F., constructed with a central opening, $f'$., surrounded by an inwardly bent or curved flange, $f^2$., on the under side thereof and side notches, $f^3$., adapted to set upon the tapering studs, and a spring, G., secured at one end to the outer portion of the base and having its free inner end resting upon the face of the adjuster, substantially as described.

4. In a twine regulator for grain binders, a base plate provided with a central opening, in combination with an adjuster of greater length than width, or oblong in form, and having a central opening mid-way of its length, and supports on the base on which said adjuster may be mounted and reversed, or changed end for end, at will, substantially as described.

5. In a twine regulator for grain binders, a base plate provided with a central opening, in combination with an adjuster, F., of oblong form, provided with a central opening, $f'$., midway of its length and side notches, $f^3$., opposite to said opening, and studs, $e^2$., adapted to enter the said side notches to support the adjuster which is readily detachable from and reversible on said supports, substantially as described.

6. In a twine regulator for grain binders, a base plate provided with a central opening, in combination with an adjuster, F., provided with a corresponding central opening, $f'$., and mounted upon supports on which it is free to tilt and readily detachable therefrom, and a spring, G., pivoted at its outer end to the base, having its inner end resting upon the adjuster and free to be turned laterally on its pivot, substantially as described.

7. In a twine regulator for grain binders, a base plate provided with a central opening, in combination with a tilting adjuster, F., having a central opening, $f'$., and mounted just above the base opening, a raised enlargement or projection, $e^3$., on the base, having a face, $e^4$., inclined slightly downward and inward, and a spring, G., secured at one end to this enlargement and at its other or free end resting upon the adjuster, substantially as described.

JAMES MACPHAIL.

Witnesses:
A. A. MURRAY,
I. A. HELMICH.